(12) United States Patent
Tangeman et al.

(10) Patent No.: US 7,491,025 B2
(45) Date of Patent: *Feb. 17, 2009

(54) FASTENER

(75) Inventors: Matthew A. Tangeman, New Bremen, OH (US); Rainer B. Teufel, Worthington, OH (US)

(73) Assignee: Midmark Corporation, Versailles, OH (US)

( * ) Notice: Subject to any disclaimer, the term of this patent is extended or adjusted under 35 U.S.C. 154(b) by 418 days.

This patent is subject to a terminal disclaimer.

(21) Appl. No.: 11/225,948

(22) Filed: Sep. 14, 2005

(65) Prior Publication Data

US 2007/0059123 A1 Mar. 15, 2007

(51) Int. Cl.
*F16B 21/02* (2006.01)
(52) U.S. Cl. .................. 411/553; 411/552; 24/590.1
(58) Field of Classification Search ............... 411/349, 411/549, 552, 553; 24/590.1, 593.1
See application file for complete search history.

(56) References Cited

U.S. PATENT DOCUMENTS

| 853,206 | A | | 5/1907 | Murphy | |
|---|---|---|---|---|---|
| 1,385,039 | A | * | 7/1921 | Bourque | 24/580.1 |
| 2,367,657 | A | | 1/1945 | Boersma | 189/36 |
| 2,771,259 | A | | 11/1956 | Laystrom | 248/28 |
| 3,123,389 | A | | 3/1964 | Biesecker | 292/218 |
| 3,220,078 | A | | 11/1965 | Preziosi | 24/221 |
| 3,764,729 | A | | 10/1973 | Kowalewski | 174/138 D |
| 4,047,266 | A | * | 9/1977 | Bisbing | 411/349 |
| 4,065,181 | A | | 12/1977 | Gunlock et al. | 297/452 |
| 4,155,127 | A | | 5/1979 | Seiderman | 4/234 |
| 4,262,394 | A | | 4/1981 | Wright | 24/73 RM |
| 4,498,827 | A | * | 2/1985 | Mair | 411/349 |
| 4,531,870 | A | | 7/1985 | Moryl et al. | 411/108 |
| 4,629,356 | A | | 12/1986 | Hayashi | 403/408.1 |
| 4,699,539 | A | * | 10/1987 | Chen | 403/24 |
| 4,705,442 | A | | 11/1987 | Fucci | 411/510 |
| 4,789,201 | A | | 12/1988 | Selbert | 292/218 |
| 4,893,978 | A | * | 1/1990 | Frano | 411/553 |
| 5,471,715 | A | * | 12/1995 | Knize | 24/586.1 |
| 5,964,017 | A | | 10/1999 | Roberts | 29/91.1 |
| 6,357,090 | B1 | * | 3/2002 | Murai | 24/593.1 |
| 6,474,921 | B1 | | 11/2002 | Gordon | 411/508 |
| 6,568,893 | B2 | | 5/2003 | LeVey et al. | 411/349 |
| 6,575,682 | B1 | | 6/2003 | Dohm et al. | 411/553 |
| 6,612,795 | B2 | | 9/2003 | Kirchen | 411/508 |
| 6,722,831 | B2 | | 4/2004 | Rogers et al. | 411/345 |
| 2005/0086773 | A1 | | 4/2005 | Kuhnle et al. | 24/297 |

* cited by examiner

*Primary Examiner*—Flemming Saether
(74) *Attorney, Agent, or Firm*—Wood, Herron & Evans, LLP

(57) ABSTRACT

A fastener for releasably securing a first substrate to an apertured second substrate includes a base member and a locking member mounted for rotation relative to the base member. The locking member is rotatable between an insertion position for insertion of the base member and locking member through the aperture formed in the second substrate and a locking position for releasably securing the first and second substrates together. A resilient member is provided to bias the locking member toward the base member when the resilient member is compressed. The locking member includes at least one protrusion and the base member includes at least one detent. The detent and protrusion are configured to releasably engage each other in the insertion position of the locking member and disengage from each other upon rotation of the locking member toward the locking position.

16 Claims, 3 Drawing Sheets

FASTENER

FIELD OF THE INVENTION

The present invention relates generally to fasteners and, more particularly, to a fastener for releasably securing a first substrate to an apertured second substrate through a ninety degree or quarter turn rotation of the fastener.

BACKGROUND OF THE INVENTION

Medical examination tables are known to have a patient supporting surface comprising a seat section and an adjustable back section. The back section is movable between a horizontal position and an inclined position so that a patient is supported in an upright position during certain medical examination procedures.

Typically, the back and seat sections are cushioned and covered with upholstery to provide a comfortable and aesthetically pleasing support surface for the patient. To that end, medical examination tables are typically offered with upholstery of different colors and textures which are selected by the medical examination professional to match a decor of the examination area.

In the past, the seat and back sections have been assembled as an integral part of the medical examination table and were typically secured to the examination table substructure through multiple screws. This type of assembly method has required manufacturers of medical examination tables to inventory a wide range of assembled examination tables with different upholstery combinations in hopes of having the proper combination to satisfy a purchaser's particular upholstery request. This approach of securing the back and seat sections to the medical examination table increases the manufacturer's inventory costs and requires additional storage space at the manufacturing facility to store the wide variety of assembled examination tables.

Alternatively, the back and seat sections have been secured to the medical examination table through Velcro® straps or snaps provided on the back and seat sections. However, these types of fastening structures are oftentimes difficult to clean and are susceptible to damage over an extended period of use. When the Velcro® straps or snaps become damaged, the back and seat sections are not firmly secured to the medical examination table and the entire back or seat section must be removed and replaced.

Accordingly, there is a need for a fastener to removably secure a back or seat section of a medical examination table to a substructure of the examination table which overcomes these and other drawbacks of the prior art.

SUMMARY OF THE INVENTION

The present invention overcomes the foregoing and other shortcomings and drawbacks of fastening arrangements heretofore known for securing a back or seat section of a medical examination table to a substructure of the examination table. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a fastener is provided for removably securing a back section or seat section of a medical examination table to a substructure of the examination table. The fastener is designed to be rotated by hand, i.e., without the use of tools, to secure the back and seat sections to the medical examination table.

According to one aspect of the present invention, the fastener comprises a base member mounted to a rear surface of the back or seat section and a twistable locking member that is mounted for rotation relative to the base member between an insertion position and a locking position. In the insertion position, the base member and the locking member of the fastener are inserted through an aperture formed in the substructure of the medical examination table. The locking member is rotated ninety degrees or a quarter turn by hand to a locking position to secure the back or seat section to the substructure of the examination table.

According to another aspect of the present invention, the base member is provided with one or more detents and the locking member is provided with one or more protrusions. The protrusions of the locking member and the detents of the base member are configured to releasably engage each other when the locking member is rotated to the insertion position. This facilitates proper orientation of the locking member relative to the base member during insertion of the fasteners through the apertures. The protrusions and the detents disengage from each other when the locking member is rotated toward the locking position.

According to yet another aspect of the present invention, one or more outwardly projecting bosses having detents formed therein are provided on the substructure of the medical examination table and positioned outwardly of each aperture. When the locking member is rotated ninety degrees or a quarter turn to the locking position, the protrusions of the locking members engage the detents formed in the bosses to thereby lock the back or seat section to the substructure of the medical examination table.

In accordance with yet another aspect of the present invention, the fastener includes a resilient member that biases the locking member toward the base member when the resilient member is compressed. The resilient member also provides a clamping force to firmly secure the back or seat section to the substructure of the medical examination table when the locking member is rotated to the locking position.

In this way, the fastener of the present invention permits the back or seat section to be readily installed or removed from the medical examination table without the use of tools. The back or seat section may be shipped directly to the medical examination site and installed on the medical examination table at that location so that prior assembly of the entire medical examination table at the manufacturer's facility is no longer required. The fastener of the present invention also gives the medical examination professional the ability to easily remove the back or seat section for cleaning or to replace the back or seat section with another of different color or texture for changing of the appearance of the medical examination table.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE PREFERRED EMBODIMENT

Referring now to the figures, an exemplary medical examination table 10 (FIG. 1) is shown incorporating fasteners 12 (FIGS. 2, 3A-B and 4A-B) of the present invention for releasably securing upholstered back and seat sections 14, 16 to a stationary base 18 of the examination table 10. As will be described in greater detail below, each of the fasteners 12 has a portion configured to be twisted or rotated ninety degrees or a quarter turn between an insertion position and a locking position to releasably secure the back and seat sections 14, 16 to the base 18. While the fasteners 12 of the present invention will be described in detail below in connection with releasably securing the back and seat sections 14, 16 to the base 18 of the medical examination table 10, it will be appreciated by those of ordinary skill in the art that the fasteners 12 of the present invention may be readily incorporated into a variety of other structures or used in a variety of other fastening applications and so are not limited for use with a medical examination table which is described herein in detail by way of example only and without limitation.

Figure 1:
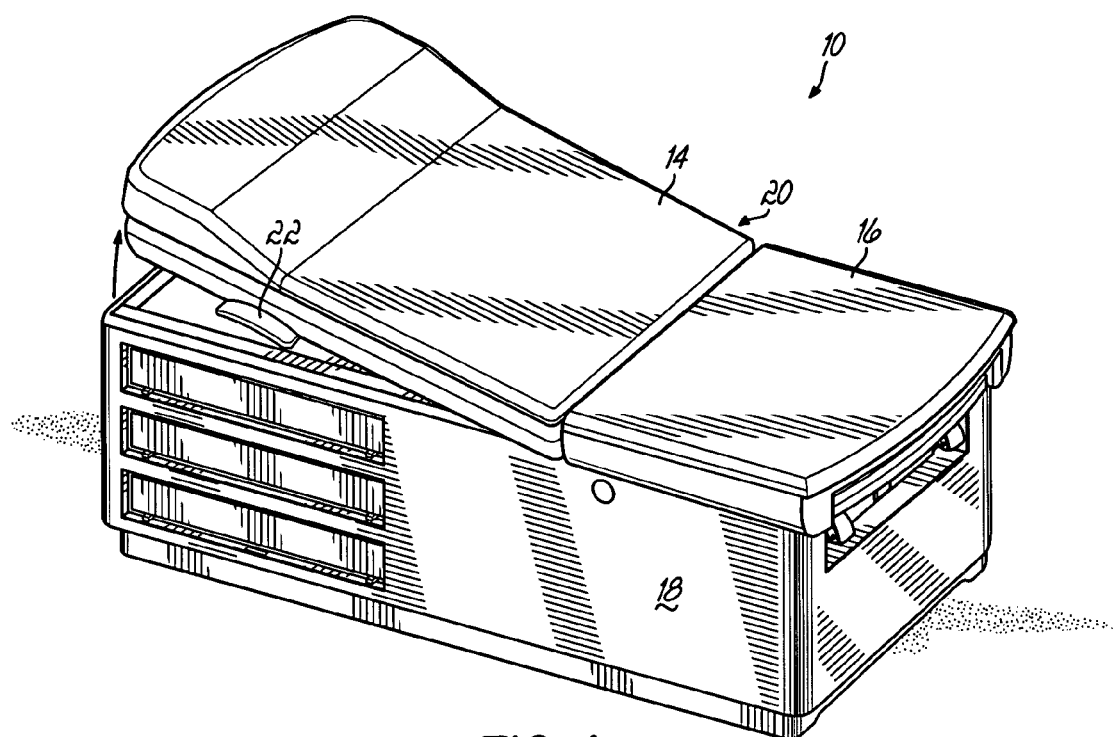
FIG. 1 is a perspective view of an exemplary medical examination table incorporating fasteners of the present invention for securing upholstered back and seat sections to a base of the medical examination table.

As shown in FIG. 1, the back and seat sections 14, 16 are mounted atop the stationary base 18 to form a patient support 20. The back section 14 is moveable relative to the seat section 16 and the base 18 between an inclined orientation for supporting a patient in a seated position and a fully reclined orientation for supporting the patient in a generally supine position. In one embodiment, the position of the back rest 14 is controlled through an adjustment mechanism 22 (FIG. 1) that is operatively connected between the base 18 and a back support 24 (FIGS. 2, 3A-B and 4A-B) upon which the back section 14 is releasably secured. The adjustment mechanism 22 permits the back section 14 to be manually moved to a desired orientation for a medical examination procedure and thereafter locked in place until the back rest 14 is moved again to readjust the patient. Those of ordinary skill in the art will appreciate that other types of adjustment mechanisms are possible as well without departing from the spirit and scope of the present invention.

Figure 2:
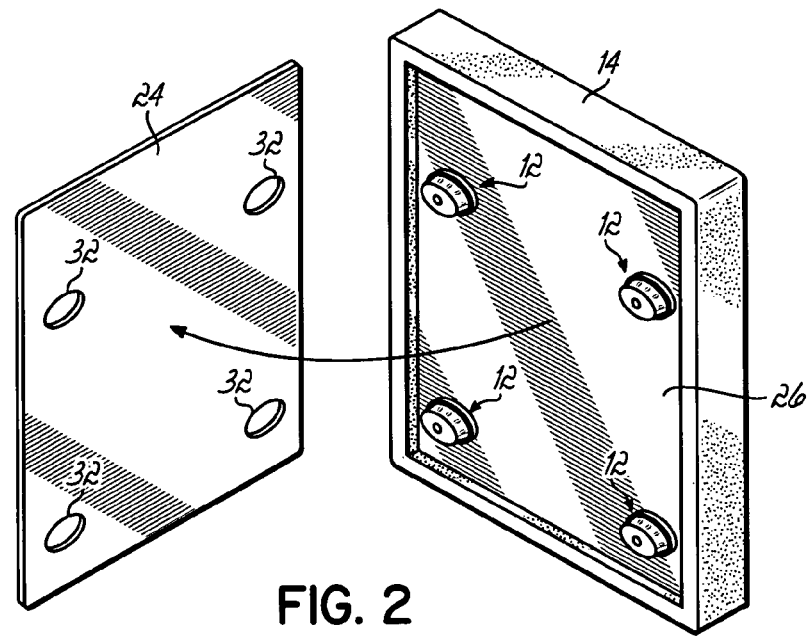
FIG. 2 is a perspective view showing installation of an upholstered back section to a back support of the medical examination table shown in FIG. 1 with the fasteners mounted to the upholstered back section and rotated to an insertion position.
Figure 4A:
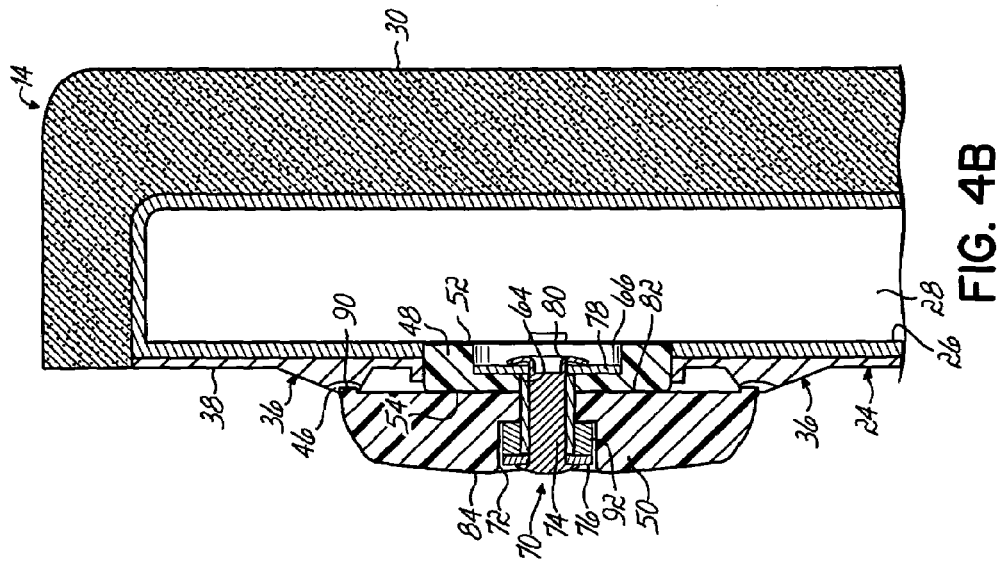
FIG. 4A is a partial cross sectional view showing one of the fasteners rotated to the insertion position and inserted through the aperture formed in the back support of the medical examination table during installation of the upholstered back section to the back support of the medical examination table.
Figure 4B:
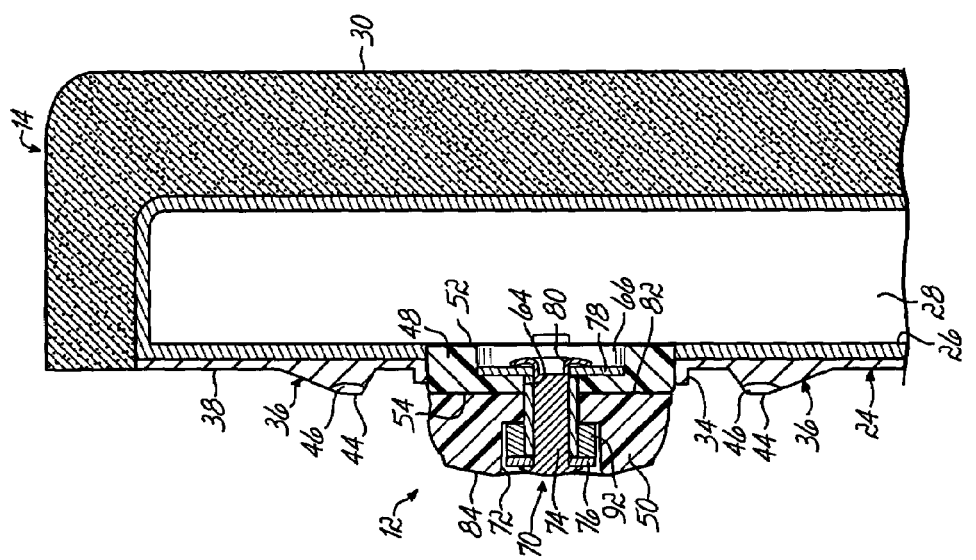
FIG. 4B is a view similar to FIG. 4A showing one of the fasteners rotated to the locking position for securing the upholstered back section to the back support of the medical examination table.

In one embodiment, as shown in FIGS. 2 and 4A-B, the upholstered back section 14 includes a support panel 26, made of wood or other generally rigid material, that is releasably secured to the back support 24 through use of the fasteners 12. A resilient body 28, such as a foam pad or other compressible material, is carried by the support panel 26 and is covered with a layer of upholstery 30. The upholstery 30, which may comprise leather, vinyl, cloth or other material having a variety of different textures and colors, is stapled, glued or otherwise fastened near its marginal edges to the support panel 26 so as to cover the resilient body 28. In this way, the back section 14 provides an aesthetically appealing and comfortable padded support surface for the patient and is easily washable following an examination procedure. While not shown, it will be appreciated that the seat section 16 has a construction similar to that of the back section 14 and so the description of the back section 14 and its construction generally applies to the seat section 16 as well.

Referring now to FIGS. 2, 3A-B and 4A-B, the fasteners 12 will now be described for releasably securing the back section 16 to the back support 24 of the medical examination table 10 in accordance with the principles of the present invention. In one embodiment, the back support 24 may be a stamped metal part that forms part of the table substructure and includes apertures 32 (four shown) in FIG. 2 formed therein that are configured to receive the fasteners 12 therethrough as will be described in detail below. An outwardly projecting lip 34 is provided around the periphery of each aperture 32 which may be formed in a known manner during the formation of the apertures 32. In one embodiment, each aperture 32 is generally oblong in shape and includes major and minor axes along the length and width, respectively, of each aperture 32. Other shapes of the apertures 32 are possible as well without departing from the spirit and scope of the present invention.

A pair of outwardly projecting and spaced apart bosses 36 (FIGS. 3A-B and 4A-B) are provided on a rear surface 38 of the back support 24 and positioned outwardly of each aperture 32. Each of the pair of bosses 36 is located on opposite sides of a respective aperture 32 with each boss 36 being positioned generally along the minor axis of the respective aperture 32. In one embodiment, each boss 36 includes a pair of inclined side walls 40 and a pair of inclined end walls 42 that converge toward a top wall 44. A detent 46 is formed in the top wall 44 of each boss 36 so as to be positioned generally along the minor axis of each respective aperture 32 and outwardly from the rear surface 38 of the back support 24. While a pair of bosses 36 is shown associated with each aperture 32, it will be understood that only a single boss 36 may be associated with each aperture 32 in an alternative embodiment of the present invention.

Figure 3A:
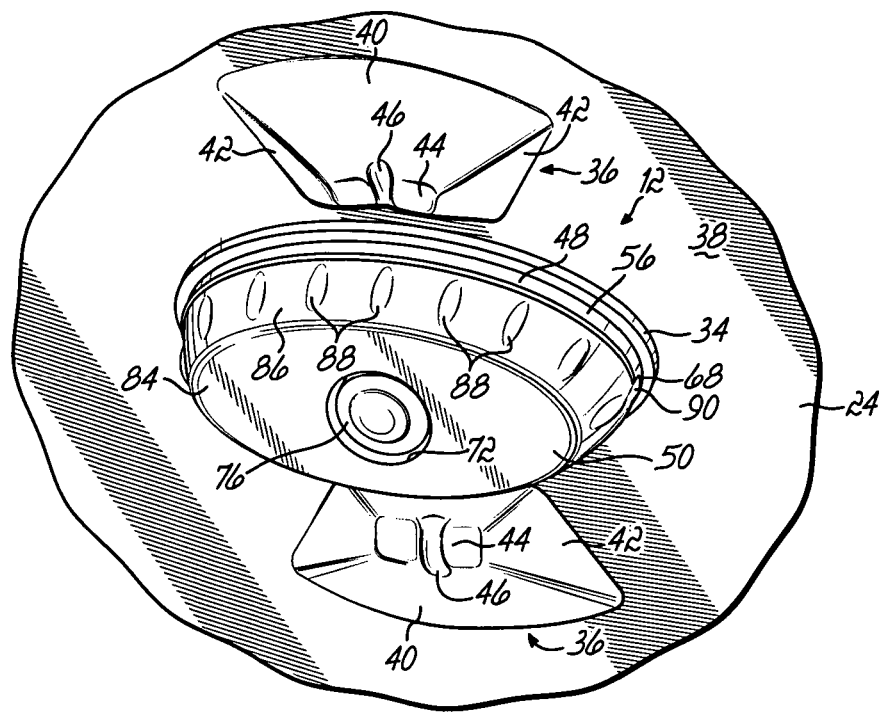
FIG. 3A is a partial perspective view showing one of the fasteners rotated to the insertion position and inserted through an aperture formed in the back support of the medical examination table of FIG. 2.
Figure 3B:
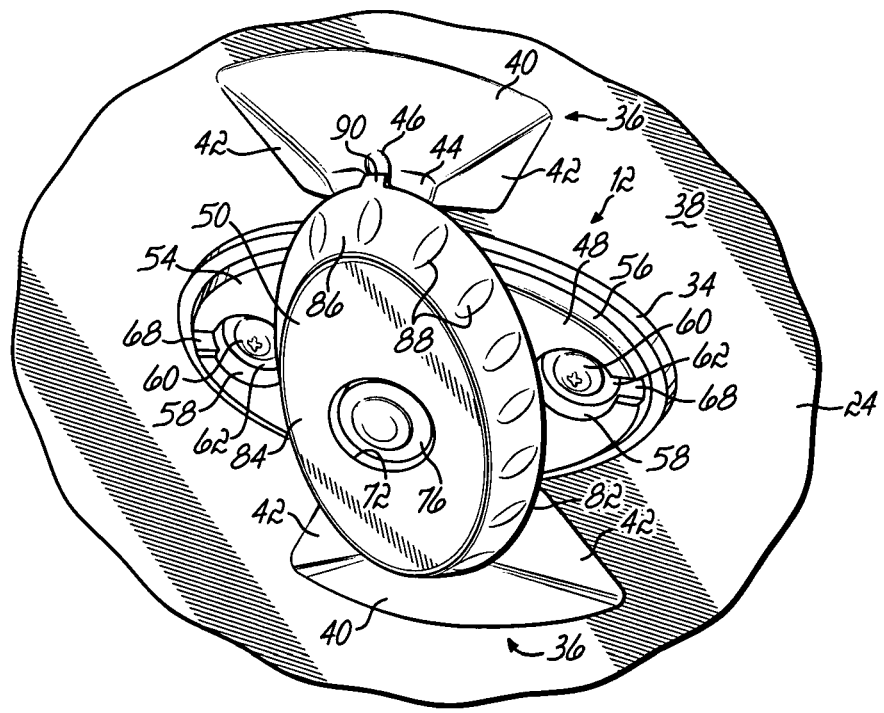
FIG. 3B is a view similar to FIG. 3A showing the fastener rotated to a locking position to secure the upholstered back section to the back support of the medical examination table.

Each fastener 12 (four shown) includes a base member 48 mounted to the rear surface 38 of the back support 24 and a twistable locking member 50 that is mounted for rotation relative to the base member 48 between an insertion position (FIGS. 2, 3A and 4A) and a locking position (FIGS. 3B and 4B). In the insertion position, the base member 48 and the locking member 50 of each fastener 12 are insertable through a respective aperture 32 formed in the back support 24 as shown in FIGS. 2, 3A and 4A. The locking member 50 is rotatable ninety degrees or a quarter turn by hand, i.e., without the use of tools, to a locking position as shown in FIGS. 3B and 4B to secure the back section 14 to the back support 24. The base member 48 and the locking member 50 of the fasteners 12 may be molded components and made of a material suitable for medical applications.

In one embodiment, each base member 48 is generally oblong in shape and includes major and minor axes along the length and width, respectively, of each fastener 12. The base member 48 has a bottom wall 52 in contact with the back support 24, an opposite and generally flat top wall 54, and a frusto-conical side wall 56 extending between the bottom and top walls 52, 54. The base member 48 is configured to be received in its respective aperture 32 with the frusto-conical sidewall 56 positioned closely adjacent the lip 34 so as to prevent undesirable movement of the back section 14 relative to the back support 24 when the back section 14 is installed on the medical examination table 10. The close fit of the base members 48 and the apertures 32 facilitate proper location of the back section 14 relative to the back support 24 during installation of the back section 14 as will be described in great detail below. Other shapes of the base member 48 are possible as well with departing from the spirit and scope of the present invention.

The base member 48 has a pair of spaced apart stepped bores 58 (FIG. 3B) formed therein and positioned generally along the major axis of the base member 48 that receive a pair of screws 60 (FIG. 3B). The screws 60 extend through the stepped bores 58 and have remote ends that engage the back support 24 to mount the fasteners 12 to the back section 14. Washers 62 (FIG. 3B) are located in the stepped bores 58 beneath the heads of the screws 60. The base member 48 also includes a central bore 64 extending therethrough that communicates with a central cavity 66 provided in the bottom wall 52 of the base member 48.

In one embodiment, the base member 48 includes a pair of spaced apart detents 68 (FIGS. 3A-B) located in the top wall 54 and positioned along the major axis of the base member 48. The detents 68 extend inwardly from the top wall 54 and are located adjacent the frusto-conical side wall 56. While a pair of detents 68 is shown provided in the top wall 54, it will be understood that only a single detent 68 may be provided in the top wall 54 in an alternative embodiment of the present invention.

As shown in FIGS. 3A-B and 4A-B, the twistable locking member 50 is rotatably supported on the base member 48 through a fastening assembly 70. The locking member 50 includes a stepped central bore 72 that is axially aligned with the central bore 64 of the base member 48. In one embodiment, the fastening assembly 70 includes a rivet 74 extending through the stepped central bore 72 of the locking member 50 and the central bore 64 of the base member 48. Washers 76, 78 are located in the central stepped bore 72 of the locking member 50 and in the central cavity 66 of the base member 48, respectively. The washer 76 is positioned beneath the head of the rivet 74 and the washer 78 is captured in the central cavity 66 of the base member 48 by a radially outwardly extending flange 80 provided at a remote end of the rivet 74. While a rivet 74 is shown for rotatably mounting the locking member 50 to the base member 48, it will be appreciated that other fastening structures, such as a nut and bolt for example, are possible as well without departing from the spirit and scope of the present invention.

In one embodiment, each locking member 50 is generally oblong in shape and includes major and minor axes along the length and width, respectively, of each fastener 12. The locking member 50 has a generally flat bottom wall 82 positioned adjacent the generally flat top wall 54 of the base member 48, an opposite and convex top wall 84, and a frusto-conical side wall 86 extending between the bottom and top walls 82, 84. Protuberances 88 or other gripping structures may be provided on the frusto-conical side wall 86 to assist a user in gripping of the twistable locking member 50. Other shapes of the locking members 50 are possible as well with departing from the spirit and scope of the present invention.

In one embodiment, the locking member 50 includes a pair of spaced apart protrusions 90 extending outwardly from the bottom wall 82 and positioned along the major axis of the locking member 50. The protrusions 90 of the locking member 50 and the detents 68 of the base member 48 are configured to releasably engage each other when the locking member 50 is rotated to the insertion position as shown in FIGS. 3A and 4A. This facilitates proper orientation of the locking member 50 relative to the base member 48 during insertion of the fasteners 12 through the apertures 32. The protrusions 90 and the detents 68 disengage from each other when the locking member 50 is rotated to the locking position as shown in FIGS. 3B and 4B. While a pair of protrusions 90 is shown extending outwardly from the bottom wall 82, it will be understood that only a single protrusion 90 may be provided on the bottom wall 82 in an alternative embodiment of the present invention.

Referring to FIGS. 4A and 4B, a resilient member 92 is located in the stepped central bore 72 of the locking member 50 and is interposed between the washer 76 and the locking member 50. In one embodiment, the resilient member 92 is made of an elastomeric material and comprises a sleeve positioned about the rivet 74, although other resilient structures, such as a spring for example, and other configurations of the resilient member 92 are possible as well without departing from the spirit and scope of the present invention. The resilient member 92 biases the locking member 50 toward the base member 48 upon compression of the resilient member 92. The resilient member 92 also provides a clamping force to secure the back section 14 to the back support 24 when the locking member 50 is rotated to the locking position shown in FIGS. 3B and 4B as will be described in greater detail below.

During installation of the back section 14 to the back support 24, each of the locking members 50 is rotated to the insertion position shown in FIGS. 2, 3A and 4A. In this position, the protrusions 90 of the locking members 50 engage the detents 68 of the base member 48 to maintain the locking members 50 in the insertion position. The back section 14 is then mounted to the back support 24 by inserting the fasteners 12 through the respective apertures 32 formed in the back support 24.

To firmly secure the back section 14 to the back support 24, each of the locking members 50 is then rotated ninety degrees or a quarter turn to the locking position shown in FIGS. 3B and 4B so that the protrusions 90 of the locking members 50 engage the detents 46 formed in the top walls 44 of the bosses 36 to thereby lock the back section 14 to the back support 24. During rotation or twisting of the locking members 50 to the locking position, the opposite ends of the locking member 50 engage the inclined end walls 42 of the bosses 36 in the travel path of the locking member 50 which causes the resilient member 92 to be compressed. In this way, the resilient member 92 biases the locking member 50 toward the base member 48 and also provides a clamping force to firmly lock the back section 14 to the back support 26.

When the back sections 14 need to be cleaned, repaired or replaced, the back sections 14 are removed from the back support 26 by rotating the locking members 50 to the insertion position shown in FIGS. 3A and 3B. This rotation disengages the protrusions 90 of the locking members 50 from the detents 46 of the bosses 36 and engages the protrusions 90 with the detents 68 of the base member 48. The back section 14 is then removed from the back support 24 by withdrawing the fasteners 12 from the apertures 32. While not shown, it will be appreciated that the seat section 16 is removably secured to the medical examination table 10 in a similar fashion using the fasteners 12 of the present invention.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of Applicants' general inventive concept.

Having described the invention, we claim:

1. A fastener for releasably securing a first substrate to a second substrate having an aperture formed therein, the second substrate further having at least one boss extending outwardly therefrom adjacent the aperture and a detent formed in the at least one boss comprising:
   a base member having a generally flat top wall and being configured to be mounted to the first substrate;
   a locking member having a generally flat bottom wall positioned adjacent the generally flat top wall of the base member and being mounted for rotation relative to the base member between an insertion position for insertion of the base member and the locking member through an aperture formed in the second substrate and a locking position for releasably securing the first and second substrates together upon rotation of the locking member relative to the base member;
   a resilient member operable to bias the locking member toward the base member upon compression of the resilient member;
   at least one detent extending inwardly from the generally flat top wall of the base member; and
   at least one protrusion extending outwardly from the generally flat bottom wall of the locking member,
   wherein the at least one detent of the base member and the at least one protrusion of the locking member are configured to releasably engage in the insertion position of the locking member and disengage upon rotation of the locking member relative to the base member toward the locking position, and
   further wherein the at least one protrusion of the locking member is configured to releasably engage with the detent of the at least one boss upon rotation of the locking member to the locking position.

2. The fastener of claim 1 further comprising:
   a pair of spaced apart detents provided on the base member; and
   a pair of spaced apart protrusions provided on the locking member.

3. The fastener of claim 1 wherein the resilient member comprises an elastomeric material.

4. The fastener of claim 1 further comprising a fastening assembly extending through the base member and the locking member and configured to mount the locking member for rotation relative to the base member.

5. The fastener of claim 4 further comprising:
   a first bore extending through the base member; and
   a second bore extending through the locking member and axially aligned with the first bore.

6. The fastener of claim 5 wherein the fastening assembly extends through the first and second bores.

7. The fastener of claim 6 wherein the second bore comprises a stepped bore.

8. The fastener of claim 6 wherein the resilient member is interposed between a portion of the fastening assembly and the locking member.

9. A fastener for releasably securing a first substrate to a second substrate having an aperture formed therein, the second substrate further having at least one boss extending outwardly therefrom adjacent the aperture and a detent formed in the at least one boss comprising:
   a base member having a generally flat top wall and being configured to be mounted to the first substrate;
   a locking member having a generally flat bottom wall positioned adjacent the generally flat top wall of the base member and being mounted for rotation relative to the base member between an insertion position for insertion of the base member and the locking member through an aperture formed in the second substrate and a locking position for releasably securing the first and second substrates together upon rotation of the locking member relative to the base member;
   at least one detent extending inwardly from the generally flat top wall of the base member; and
   at least one protrusion extending outwardly from the generally flat bottom wall of the locking member,
   wherein the at least one detent of the base member and the at least one protrusion of the locking member are configured to releasably engage in the insertion position of the locking member and disengage upon rotation of the locking member relative to the base member toward the locking position, and
   further wherein the at least one protrusion of the locking member is configured to releasably engage with the detent of the at least one boss upon rotation of the locking member to the locking position.

10. The fastener of claim 9 further comprising:
    a pair of spaced apart detents provided on the base member; and
    a pair of spaced apart protrusions provided on the locking member.

11. The fastener of claim 9 further comprising a fastening assembly extending through the base member and the locking member and configured to mount the locking member for rotation relative to the base member.

12. The fastener of claim 11 further comprising:
    a first bore extending through the base member; and
    a second bore extending through the locking member and axially aligned with the first bore.

13. The fastener of claim 12 wherein the fastening assembly extends through the first and second bores.

14. The fastener of claim 13 wherein the second bore comprises a stepped bore.

15. A fastener installation, comprising:
    a first substrate;
    a second substrate having an aperture formed therein;
    a pair of spaced apart bosses extending outwardly from the second substrate adjacent the aperture;
    a detent formed in each of the pair of bosses; and
    a fastener mounted to the first substrate and configured to releasably secure the first substrate to the apertured second substrate, the fastener comprising:
        a base member having a generally flat top wall and being mounted to the first substrate;
        a locking member having a generally flat bottom wall positioned adjacent the generally flat top wall of the base member and being mounted for rotation relative to the base member between an insertion position for insertion of the base member and the locking member through the aperture formed in the second substrate and a locking position for releasably securing the first and second substrates together upon rotation of the locking member relative to the base member;

a resilient member operable to bias the locking member toward the base member upon compression of the resilient member;

a pair of spaced apart detents extending inwardly from the generally flat top wall of the base member; and a pair of spaced apart protrusions extending outwardly from the generally flat bottom wall of the locking member, wherein the pair of detents of the base member and the pair of protrusions of the locking member are configured to releasably engage in the insertion position of the locking member and disengage upon rotation of the locking member relative to the base member toward the locking position, and further wherein the protrusions of the locking member are configured to releasable engage with the detents of the bosses upon rotation of the locking member to the locking position.

16. A fastener installation, comprising:

a first substrate;

a second substrate having an aperture formed therein;

a pair of spaced apart bosses extending outwardly from the second substrate adjacent the aperture;

a detent formed in each of the pair of bosses; and a fastener mounted to the first substrate and configured to releasably secure the first substrate to the apertured second substrate, the fastener comprising:

a base member having a generally flat top wall and being mounted to the first substrate;

a locking member having a generally flat bottom wall positioned adjacent the generally flat top wall of the base member and being mounted for rotation relative to the base member between an insertion position for insertion of the base member and the locking member through the aperture formed in the second substrate and a locking position for releasably securing the first and second substrates together upon rotation of the locking member relative to the base member;

a pair of spaced apart detents extending inwardly from the generally flat top wall of the base member; and a pair of spaced apart protrusions extending outwardly from the generally flat bottom wall of the locking member, wherein the pair of detents of the base member and the pair of protrusions of the locking member are configured to releasably engage in the insertion position of the locking member and disengage upon rotation of the locking member relative to the base member toward the locking position, and further wherein the protrusions of the locking member are configured to releasably engage with the detents of the bosses upon rotation of the locking member to the locking position.

\* \* \* \* \*